United States Patent
Bishop et al.

(10) Patent No.: US 7,636,651 B2
(45) Date of Patent: Dec. 22, 2009

(54) ROBUST BAYESIAN MIXTURE MODELING

(75) Inventors: Christopher M. Bishop, Cambridge (GB); Johan Fredrik Markus Svensén, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 492 days.

(21) Appl. No.: 10/724,586

(22) Filed: Nov. 28, 2003

(65) Prior Publication Data

US 2005/0119829 A1  Jun. 2, 2005

(51) Int. Cl.
  G06F 7/60 (2006.01)
  G06F 17/10 (2006.01)
  G06E 1/00 (2006.01)
  G06E 3/00 (2006.01)
  G06G 7/00 (2006.01)
(52) U.S. Cl. ............................. 703/2; 706/19
(58) Field of Classification Search .............. 703/2; 706/19
  See application file for complete search history.

(56) References Cited

U.S. PATENT DOCUMENTS

| | | | | |
|---|---|---|---|---|
| 5,555,191 A * | 9/1996 | Hripcsak | ................... | 709/224 |
| 5,696,884 A * | 12/1997 | Heckerman et al. | ........... | 706/61 |
| 5,704,018 A * | 12/1997 | Heckerman et al. | ........... | 706/12 |
| 5,789,539 A * | 8/1998 | Daly et al. | .................. | 530/324 |
| 5,802,256 A * | 9/1998 | Heckerman et al. | ........... | 706/59 |
| 6,529,888 B1 * | 3/2003 | Heckerman et al. | ........... | 706/45 |
| 6,671,661 B1 | 12/2003 | Bishop | | |
| 7,184,993 B2 | 2/2007 | Heckerman | | |
| 2002/0016699 A1 * | 2/2002 | Hoggart et al. | .................. | 703/2 |
| 2002/0055913 A1 * | 5/2002 | Rajan | ........................... | 706/19 |
| 2002/0072772 A1 * | 6/2002 | Meyer et al. | ................... | 607/4 |
| 2002/0111742 A1 * | 8/2002 | Rocke et al. | ................... | 702/19 |
| 2003/0176931 A1 * | 9/2003 | Pednault et al. | ............... | 700/31 |
| 2004/0098207 A1 * | 5/2004 | Friggens et al. | ............... | 702/32 |
| 2004/0124012 A1 * | 7/2004 | Dunlop et al. | ................ | 175/57 |
| 2004/0128261 A1 * | 7/2004 | Olavson et al. | ............ | 705/400 |
| 2004/0152995 A1 * | 8/2004 | Cox et al. | .................... | 600/544 |
| 2004/0217760 A1 * | 11/2004 | Madarasz et al. | ........... | 324/307 |

OTHER PUBLICATIONS

Hirokazu Kameoka, Takuya Nishimoto and Shigeki Sagayama, "Multi-Pitch Detection Algorithm Using Constrained Gaussian Mixture Model and Information Criterion for Simultaneous Speech," Proc.Speech Prosody 2004 (Nara, Japan), pp. 533-536, Mar. 2004.*
Hirokazu Kameoka, Takuya Nishimoto and Shigeki Sagayama, "Accurate Detection Algorithm for Concurrent Sounds Based on EM Algorithm and Information Criterion," Proc.Special Workshop in Maui(SWIM) Maui, USA,in CD-rom.Jan. 2004.*
Hierarchical Bayesian models for applications in information retrieval. D. M. Blei, M. I. Jordan and A. Y. Ng. In: J. M. Bernardo, M. Bayarri, J. 0. Berger, A. P. Dawid, D. Heckerman, A. F. M. Smith, and M. West (Eds.), Bayesian Statistics 7, 2003.*

(Continued)

*Primary Examiner*—Kamini S Shah
*Assistant Examiner*—David Silver (57) ABSTRACT

A Bayesian treatment of mixture models is based on individual components having Student distributions, which have heavier tails compared to the exponentially decaying tails of Gaussians. The mixture of Student distribution components is characterized by a set of modeling parameters. Tractable approximations of the posterior distributions of individual modeling parameters are optimized and used to generate a data model for a set of input data.

64 Claims, 4 Drawing Sheets

OTHER PUBLICATIONS

Christopher M. Bishop, Markus Svensén: "Robust Bayesian Mixture Modelling". ESANN 2004: 69-74.*

Christopher M. Bishop, "Publications List", http://research.microsoft.com/~cmbishop/publications.htm.*

Markus Svensén, "Markus Svensén's Publications", http://research.microsoft.com/%7Emarkussv/pubs_all.aspx.*

Markus Svensen and Christopher M. Bishop, Robust Bayesian mixture modelling, Neurocomputing, vol. 64, Trends in Neurocomputing: 12th European Symposium on Artificial Neural Networks 2004, Mar. 2005, pp. 235-252. (http://www.sciencedirect.com/science/article/B6V10-4F924NT-B/2/efe9d29ba53c11b8d050870f440f68a8).*

D. Barber and C. Bishop. Ensemble learning in Bayesian neural networks. In C. Bishop, editor, Neural Networks and Machine Learning, pp. 215-237. Springer, Berlin, 1998. (Renumbered As pp. 1-20).*

Corduneanu, A. and C. M. Bishop (2001). Variational Bayesian model selection for mixture distributions. In T. Richardson and T. Jaakkola (Eds.), Proceedings Eighth International Conference on Artificial Intelligence and Statistics, pp. 27-34. Morgan Kaufmann.*

Bishop, C. M. (2002). Discussion of 'Bayesian treed generalized linear models' by H. A. Chipman, E. I. George and R. E. McCulloch. In J. M. Bernardo, M. J. Bayarri, J. O. Berger, A. P. Dawid, D. Heckerman, A. F. M. SMith, and M. West (Eds.), Proceedings Seventh Valencia International Meeting on Bayesian Statistics, vol. 7, pp. 98-101. Oxford Uni.*

Virtanen, T.; Klapuri, A., "Separation of harmonic sounds using linear models for the overtone series," Acoustics, Speech, and Signal Processing, 2002. Proceedings. (ICASSP '02). IEEE International Conference on , vol. 2, no. pp. 1757-1760, 2002.*

S. Richardson and P. J. Green. "On bayesian analysis of mixtures with unknown number of components". Journal of the Royal Statistical Society, Series B, 59:731-792, 1997.

H. Attias. "Inferring Parameters and structure of latent variables by variational Bayes". In K. B. Laskey and H. Prade, editors, Proceedings of the Fifthteenth Conference on Uncertainty in Artificial Intelligence, 1999.

C. M. Bishop and J. Winn. "Non-linear Bayesian image modeling". In Proceedings of the Sixth European Conference on Computer Vision, Dublin, vol. 1, pp. 3-17. Springer, 2000.

G. J. McLachlan and D. Peel. "Robust cluster analysis via mixtures of multivariate-distributions". Lecture Notes in Computer Science, 1451:658-666,1998.

C. Liu and D. B. Rubin. "ML estimation of the t distribution using EM and its extensions", ECM and ECME. Statistica Sinica, 5:19-39, 1995.

M. I. Jordan, Z. Ghahramani, T. S. Jaakkola, and L. K. Saul. "An introduction to variational methods for graphical models". In M. I. Jordan, editor, Learning in Graphical Models, pp. 105-162. Kluwer, 1998.

D. M. Blei, M. I. Jordan, and A. Y. Ng. "Hierarchical Bayesian models for applications in information retrieval". In G. Tesauro, D. S. Touretzky, and T. K. Leen, editors, Bayesian Statistics, vol. 7, pp. 25-43. Oxford University Press, 2003.

J. Ajmera, H. Bourlard, I. Lapidot, and I. McCowan. "Unknown-multiple Speaker Clustering using HMM." In Proceedings of the International Conference on Speech and Language Processing, Sep. 2002.

* cited by examiner

ROBUST BAYESIAN MIXTURE MODELING

TECHNICAL FIELD

The invention relates generally to statistical analysis and machine learning algorithms, and more particularly to robust Bayesian mixture modeling.

BACKGROUND

Mixture models are common tools of statistical analysis and machine learning. For example, when trying to model a statistical data distribution, a single Gaussian model may not adequately approximate the data, particularly when the data has multiple modes or clusters (e.g., has more than one peak).

As such, a common approach is to use a mixture of two or more Gaussian components, fitted with a maximum likelihood, to model such data. Nevertheless, even a mixture of Gaussians (MOG) presents modeling problems, such as inadequate modeling of outliers and severe overfitting. For example, there are singularities in the likelihood function arising from the collapse of components onto individual data points—a pathological result.

Some problems with a pure MOG can be elegantly addressed by adopting a Bayesian framework to marginalize over the model parameters with respect to appropriate priors. The resulting Bayesian model likelihood can then be maximized with respect to the number of Gaussian components in the mixture, if the goal is model selection, or combined with a prior over the number of the components, if the goal is model averaging. One benefit to a Bayesian approach using a mixture of Gaussians is the elimination of maximum likelihood singularities, although it still lacks robustness to outliers. In addition, in the Bayesian model selection context, the presence of outliers or other departures from the empirical distribution of Gaussianity can lead to errors in the determination of the number of clusters in the data.

SUMMARY

Implementations described and claimed herein address the foregoing problems using a Bayesian treatment of mixture models based on individual components having Student distributions, which have heavier tails compared to the exponentially decaying tails of Gaussians. The mixture of Student distribution components is characterized by a set of modeling parameters. Tractable approximations of the posterior distributions of individual modeling parameters are optimized and used to generate a data model for a set of input data.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

The computer program product encodes a computer program for executing a computer process on a computer system. A modeling parameter is selected from a plurality of modeling parameters characterizing a mixture of Student distribution components. A tractable approximation of a posterior distribution for the selected modeling parameter is computed based on an input set of data and a current estimate of a posterior distribution of at least one unselected modeling parameter in the plurality of modeling parameters. A lower bound of a log marginal likelihood is computed as a function of current estimates of the posterior distributions of the modeling parameters. The current estimates of the posterior distributions of the modeling parameters include the computed tractable approximation of the posterior distribution of the selected modeling parameter. A probability density that models the input set of data is generated, if the lower bound is satisfactorily optimized. The probability density includes the mixture of Student distribution components, which is characterized by the current estimates of the posterior distributions of the modeling parameters.

In another implementation, a method is provided. A modeling parameter is selected from a plurality of modeling parameters characterizing a mixture of Student distribution components. A tractable approximation of a posterior distribution for the selected modeling parameter is computed based on an input set of data and a current estimate of a posterior distribution of at least one unselected modeling parameter in the plurality of modeling parameters. A lower bound of a log marginal likelihood is computed as a function of current estimates of the posterior distributions of the modeling parameters. The current estimates of the posterior distributions of the modeling parameters include the computed tractable approximation of the posterior distribution of the selected modeling parameter. A probability density that models the input set of data is generated, if the lower bound is satisfactorily optimized. The probability density includes the mixture of Student distribution components, which is characterized by the current estimates of the posterior distributions of the modeling parameters.

In another implementation, a system is provided. A tractable approximation module computes a tractable approximation of a posterior distribution for the selected modeling parameter based on an input set of data and a current estimate of a posterior distribution of at least one unselected modeling parameter in the plurality of modeling parameters. A lower bound optimizer module computes a lower bound of a log marginal likelihood as a function of current estimates of the posterior distributions of the modeling parameters. The current estimates of the posterior distributions of the modeling parameters include the computed tractable approximation of the posterior distribution of the selected modeling parameter. A data model generator generates a probability density modeling the input set of data, if the lower bound is satisfactorily optimized. The probability density includes the mixture of Student distribution components. The mixture of Student distribution components is characterized by the current estimates of the posterior distributions of the modeling parameters.

Other implementations are also described and recited herein.

DETAILED DESCRIPTION

Figure 1:
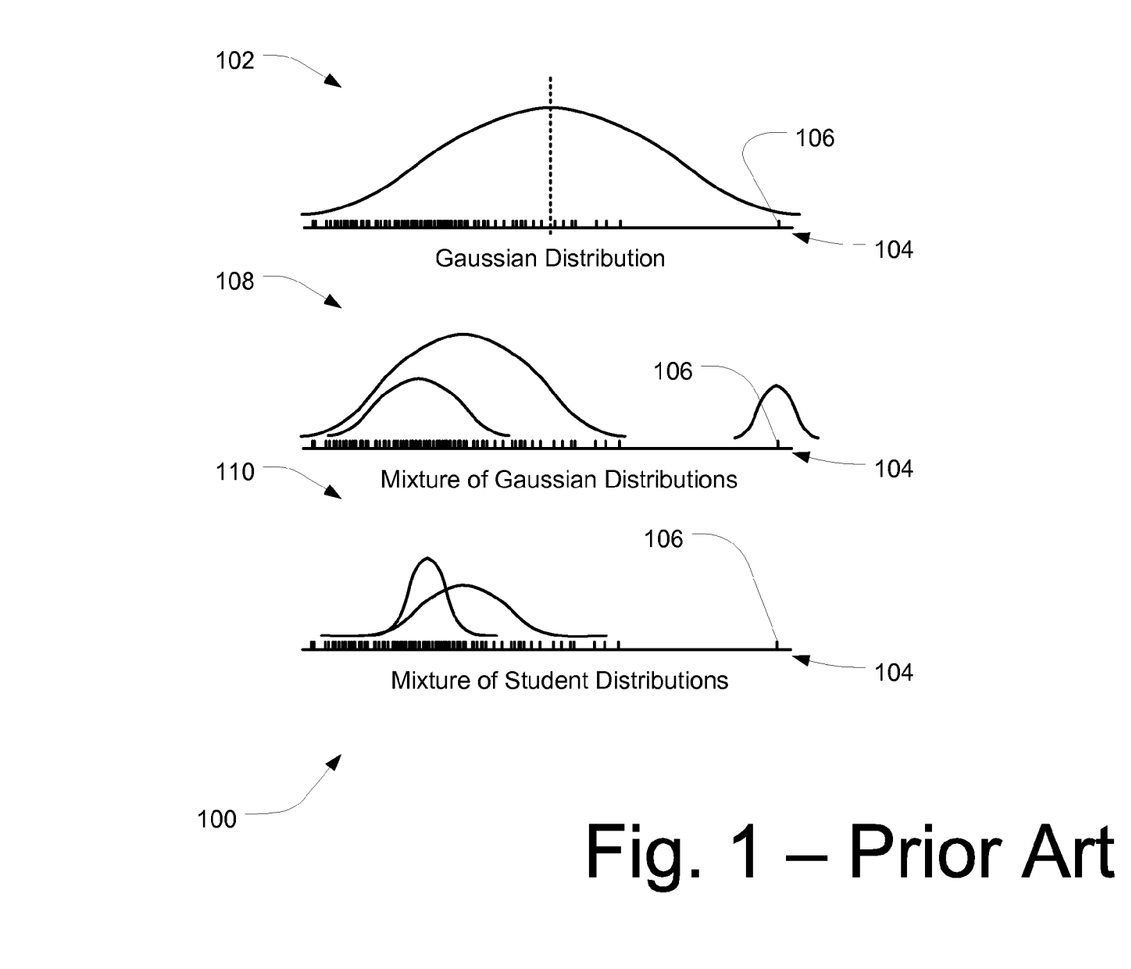
FIG. 1 illustrates exemplary probability distributions for modeling a data set.

FIG. 1 illustrates exemplary probability distributions 100 for modeling a data set. A single Gaussian distribution 102 models an input data set of independent identically distributed (idd) data 104. Note that the mean 106 of the single Gaussian distribution 102 is pulled substantially to the right in order accommodate the outlier data element 106, thereby compromising the accuracy of the Gaussian model as it applies to the given data set 104. In addition, the standard deviation of the distribution 102 is undesirably increased by the outlier 106.

In order to improve the modeling of the data 104, a mixture of Gaussian distributions 108 may be used. However, fitting the mixture 108 to the data set 104 using a maximum likelihood approach does not yield a usable optimal number of components because the maximum likelihood approach favors an ever more complex model, leading to the undesirable extreme of individual, infinite magnitude Gaussian distribution component for individual data point. While overfitting of Gaussian mixture models can be addressed to some extent using Bayesian inference, even then, Gaussian mixture models continue to lack robustness as to outliers.

A mixture of Student distributions 110 can demonstrate a significant improvement in robustness as compared to a mixture of Gaussian distributions. However, there is no closed form solution for maximizing the likelihood under a Student distribution. Furthermore, the maximum likelihood approach does not address the problem of overfitting. Therefore, a mixture of Student distributions 110 combined with a tractable Bayesian treatment to fit the Student mixture to the input data 104 addresses these issues, as illustrated in FIG. 1. However, no satisfactory method or system for obtaining a tractable Bayesian treatment of Student mixture distributions has previously been demonstrated. As such, in one implementation, robust Bayesian mixture modeling obtains a tractable Bayesian treatment of Student mixture distributions based on variational inference. In another implementation, a tractable approximation may be obtained using Monte Carlo-based techniques.

Robust Bayesian mixture modeling is based on a mixture of component distributions given by a multivariate Student distribution, also known as a t-distribution. A Student distribution represents a generalization of a Gaussian distribution and, in the limit $v \rightarrow \infty$, the Student distribution reduces to a Gaussian distribution with mean $\mu$ and precision $\Lambda$ (i.e., inverse covariance). For finite values of $v$, the Student distribution has heavier tails than the corresponding Gaussian having the same $\mu$ and $\Lambda$.

A Student distribution over a d-dimensional random variable x may be represented in the following form:

$$S(x \mid \mu, \Lambda, v) = \frac{\Gamma\left(\frac{v+d}{2}\right)|\Lambda|^{\frac{1}{2}}}{\Gamma\left(\frac{v}{2}\right)(v\pi)^{\frac{d}{2}}} \left(\frac{\Delta^2}{v}+1\right)^{-\frac{v+d}{2}} \quad (1)$$

where $\Delta^2 = (x-\mu)^T \Lambda (x-\mu)$ represents the squared Mahalanobis distance from x to $\mu$.

In contrast to the Gaussian distribution, no closed form solution for maximizing likelihood exists under a Student distribution. However, the Student distribution may be represented as an infinite mixture of scaled Gaussian distributions over x with an additional random variable u, which acts as a scaling parameter of the precision matrix $\Lambda$, such that the Student distribution may be represented in the following form:

$$S(x \mid \mu, \Lambda, v) = \int_0^\infty N(x \mid \mu, \Lambda u) G\left(u \mid \frac{v}{2}, \frac{v}{2}\right) du \quad (2)$$

where $N(x|\mu,\Lambda)$ denotes the Gaussian distribution with mean $\mu$ and precision matrix $\Lambda u$, and $G(u|a,b)$ represents the Gamma distribution. For each observation of x (i.e., of N observations), a corresponding implicit posterior distribution over the variable u exists.

The probability density of mixtures of M Student distributions may be represented in the form:

$$p(x \mid \{\mu_m, \lambda_m, v_m\}, \pi) = \sum_{m=1}^{M} \pi_m S(x \mid \mu_m, \Lambda_m, v_m) \quad (3)$$

where the mixing coefficients $\pi = (\pi_1, \ldots, \pi_M)^T$ satisfy $0 \leq \pi_m \leq 1$ and $$\sum_{m=1}^{M} \pi_m = 1.$$

In order to find a tractable treatment of this model, the mixture density of Equation (3) may be expressed in terms of a marginalization over a binary latent labeling variable s of dimensions N×M (i.e., N representing the number of data elements and M representing the number of Student distribution components in the mixture) and the unobserved variable $u_{nm}$, also of dimensions N×M when applied to a mixture. Variable s has components $\{S_{nj}\}$ such that $s_{nm}=1$ and $s_{nj}=0$ for $j \neq m$, resulting in:

$$p(x_n \mid s, \{\mu_m, \Lambda_m, v_m\}) = \prod_{n,m}^{N,M} S(x \mid \mu_m, \Lambda_m, v_m)^{s_{nm}} \quad (4)$$

with a corresponding prior distribution over s of the form:

$$p(s \mid \pi) = \prod_{n,m}^{N,M} \pi_m^{s_{nm}} \quad (5)$$

It can be verified that marginalization of the product of Equations (4) and (5) over the latent variable s recovers the Student distribution mixture of Equation (3).

An input data set X includes N idd observations $x_n$, where $n=1, \ldots, N$, which are assumed to be drawn independently from the distribution characterized by Equation (3). Thus, for each data observation $X_n$, a corresponding discrete latent variable $s_n$, specifies which component of the mixture generated that data point, and continuous latent variable $u_{nm}$ specifies the scaling of the precision for the corresponding equivalent Gaussian distribution from which the data was hypothetically generated.

In addition to the prior distribution over s, prior distributions for the modeling parameters $\mu_m, \Lambda_m$, and $\pi$, are used in a Bayesian treatment of probability density estimation. As such, distributions of the modeling parameters are used rather than the parameters themselves. In one implementation, for tractability, conjugate priors from the exponential family have been chosen in the form:

$$p(\mu_m) = N(\mu_m | m, \rho I) \qquad (6)$$

$$p(\Lambda_m) = W(\Lambda_m | W_0 \eta_0) \qquad (7)$$

$$p(\pi) = D(\pi | \alpha) \qquad (8)$$

wherein $W(\Lambda | \Box, \Box)$ represents the Wishart distribution and $D(\pi | \Box)$ represents the Dirichlet distribution. The prior $p(u)$ is implicitly defined in Equation (2) to equal the Gamma distribution $$G\left(u \mid \frac{v}{2}, \frac{v}{2}\right).$$

It should be understood that prior distributions may be selected from other members of the exponential family in alternative embodiments. The parameters of the prior distributions on $\mu$ and $\Lambda$ are chosen to give broad distributions (e.g., in one implementation, $m_0=0$, $\rho_0=10^{-3}$, $W_0 I$, $\eta_0=1$. For the prior distribution over $\pi$, $\alpha=\{\alpha_m\}$ are interpreted as effective numbers of prior observations, with $\alpha_m=10^{-3}$.

Exact inference of the Bayesian model is intractable. However, with the choice of exponential distributions to represent the prior distributions of the modeling parameters, tractable approximations are possible. In one implementation, for example, a tractable approximation may be obtained through Monte Carlo techniques.

In another implementation, variational inference may be employed to obtain tractable approximations of the posterior distributions over the identified stochastic modeling parameters, which in one implementation includes $\{\mu_m, \Lambda_m\}$, $\pi$, and $\{s_m, u_n\}$. (Another modeling parameter, $v$, is treated in a deterministic (i.e., non-stochastic) fashion; however, only one such parameter exists per mixture component.).

In variational inference, the log-marginal likelihood is maximized. One form of the log-marginal likelihood is shown:

$$\ln \prod_n^N p(x_n | m_0, \rho_0, W_0, \eta_0) = \qquad (9)$$

$$\ln \int \prod_n^N p(x_n, u_n | \mu, \Lambda, v) p(\mu | m_0, \rho_0) p(\Lambda | W, \eta) du_n d\mu d\Lambda$$

This quantity cannot be maximized directly. However, Equation (9) can be re-written as follows:

$$\ln \int p(X | \theta) p(\theta | m_0, \rho_0, W_0, \eta_0, v) d\theta = \qquad (10)$$

$$\int q(\theta) \ln \frac{p(X, \theta | m_0, \rho_0, W_0, \eta_0, v)}{q(\theta)} d\theta -$$

$$\int q(\theta) \ln \frac{p(\theta, X | m_0, \rho_0, W_0, \eta_0, v)}{q(\theta)} d\theta$$

where $X=\{x_n\}$, $\theta=\{\mu, \Lambda, u\}$, $u=\{u_n\}$, and $q(\theta)$ is the so-called variational distribution over $\mu, \Lambda$, and $u$, such that $q(\theta)=q(\mu)q(\Lambda)q(u)$ (assuming $q(\mu), q(\Lambda)$, and $q(u)$ are independent).

The second term of Equation (10) is the Kullback-Leibler (KL) divergence between $q(\theta)$ and $p(\theta | \{x_n\}, m_0, \rho_0, W_0, \rho_0, v)$, which is non-negative and zero only if the two distributions are identical. Thus, the first term can be understood as the lower bound of the log-marginal likelihood $\Lambda(q)$. Therefore, seeking to minimize the second term of Equation (10) amounts to maximizing the lower bound $\Lambda(q)$.

Accordingly, one way to represent the lower bound $\Lambda(q)$ is shown:

$$L(qq) \equiv \int q(\theta) \ln \left\{ \frac{p(X, \theta)}{q(\theta)} \right\} d\theta \leq \ln p(X) \qquad (11)$$

where $\theta$ represents the set of all unobserved stochastic variables.

In Equation (11), $q(\theta)$ represents the variational posterior distribution, and $p(X, \theta)$ is the joint distribution over the stochastic modeling parameters. The difference between the right hand side of Equation (11) and $\Lambda(q)$ is given by the KL divergence $KL(q||p)$ between the variational posterior distribution $q(\theta)$ and the true posterior distribution $p(\theta, X)$.

Given the priors of Equations (5), (6), (7), and (8), the variational posterior distributions $q(\bullet)$ for $s, \pi, \mu_m, \Lambda_m$, and $u$ may be computed.

For $q(s)$, where $s$ represents the labeling parameters:

$$q(s) = \prod_{n,m}^{N,M} p_{nm}^{s_{nm}} \qquad (12)$$

where $$p_{nm} = \frac{r_{nm}}{\sum_{m=1}^{M} r_{nm'}} \qquad (13)$$

where, in turn, $$r_{nm} = \exp\left( \langle \ln \pi_m \rangle + \frac{1}{2} \langle \ln |\Lambda_m| \rangle + \frac{d}{2} \langle \ln u_{nm} \rangle - \frac{\langle u_{nm} \rangle \langle \Delta_{nm}^2 \rangle}{2} - \frac{d}{2} \ln 2\pi \right) \qquad (14)$$

Although the last term in the argument for the exponential cancels out in Equation (13). In addition, $$\langle \ln |\Lambda_m| \rangle = d \ln 2 - \ln |W| + \sum_{i=1}^{d} \Psi\left( \frac{\eta + 1 - i}{2} \right) \qquad (15)$$

$$\langle \Delta_n^2 \rangle = x_n^T \eta_m W_m x_n - 2 x_n^T \eta_m W_m m_m + Tr[(m_m m_m^T + R_m^{-1}) \eta_m W_m] \qquad (16)$$

and $$\langle s_{nm} \rangle = p_{nm} \qquad (17)$$

For q(π), where π represents the mixing coefficients:

$$q(\pi) = D(\pi|\alpha) \quad (18)$$

where $$\alpha_m = \sum_{n=1}^{N} \langle s_{nm} \rangle + \hat{\alpha}_m \quad (19)$$

and $$\langle \pi_m \rangle = \frac{\alpha_m}{\alpha_0} \quad (20)$$

where $$\Psi(a) = \frac{d \ln \Gamma(a)}{da} \quad (21)$$

and m'=1, ..., M. Furthermore, $$\langle \ln \pi_m \rangle = \Psi(\alpha_m) - \Psi(\alpha_0),$$

where $$\alpha_0 = \sum_{m'} \alpha_{m'}$$

For $q(\mu_m)$, where $\mu_m$ represents the mean of the $m^{th}$ Student distribution component in the mixture:

$$q(\mu_m) = N(\mu_m | m_m, R_m) \quad (22)$$

where $$R_m = \langle \Lambda_m \rangle \sum_{n=1}^{N} \langle w_{nm} \rangle + \rho_0 I \quad (23)$$

$$m_m = R_m^{-1} \left( \langle \Lambda_m \rangle \sum_{n=1}^{N} \langle w_{nm} \rangle x_n + \rho_0 m_0 \right)$$

and $$\langle w_{nm} \rangle = \langle s_{nm} \rangle \langle u_{nm} \rangle \quad (24)$$

For $q(\Lambda_m)$, where $\Lambda_m$ represents the precision matrix of the $m^{th}$ Student distribution component in the mixture:

$$q(\Lambda_m) = W(\Lambda_m | W_m, \eta_m) \quad (25)$$

where $$W_m^{-1} = W_0^{-1} + \sum_{n}^{N} \langle w_{nm} \rangle (x_n x_n^T - x_n m_m^T - m_m x_n^T + (m_m m_m^T + R_m^{-1})) \quad (26)$$

and $$\eta_m = \eta_0 + \hat{s}_m \text{ where} \quad (27)$$

$$\hat{s}_m = \sum_{n}^{N} \langle s_{nm} \rangle.$$

For q(u), where u represents the scaling parameters of the precision matrices:

$$q(u_{nm}) = G(u_{nm} | a_{nm}, b_{nm}) \quad (28)$$

where $$a_{nm} = \frac{v_m + \langle s_{nm} \rangle d}{2} \quad (29)$$

where d represents the dimensionality of the data, $$b_{nm} = \frac{v_m + \langle s_{nm} \rangle \langle \Delta_{nm}^2 \rangle}{2} \quad (30)$$

and $$\langle \Delta_{nm}^2 \rangle = x_n^T \eta_m w_m x_n - 2 x_n^T \eta_m w_m m_m + Tr[(m_m m_m^T + R_m^{-1}) \eta_m w_m] \quad (31)$$

A constrained family of distributions for q(θ) is chosen such that the lower bound Λ(q) becomes tractable. The optimal member of the family can then be determined by maximization of Λ(q), which is equivalent to minimization of the KL divergence. Thus, the resulting optimal solution for q(θ) represents an approximation of the true posterior of p(θ|{$x_n$}, $m_0, \rho_0, W_0, \eta_0, v$), assuming a factorized variational distribution for q(θ) of:

$$q(\theta) = q(\{\mu_m\}) q(\{\Lambda_m\}) q(\pi) q(\{s_n\}) q(\{u_n\}) \quad (32)$$

A free-form variational optimization is now possible with respect to each of the individual variational factors of Equation (32). Because the variational factors are coupled, the variational approximations of the factors are computed iteratively by first initializing the distributions, and then cycling to each factor in turn and replacing its current estimate by its optimal solution, given the current estimates for the other factors, to give a new approximation of q(θ). Interleaved with the optimization with respect to each of the individual variational factors, the lower bound is optimized with respect to each of the non-stochastic parameters $v_m$ by employing standard non-linear optimization techniques. The lower bound Λ(q) is then computed using the new approximation of q(θ) for the current iteration In one implementation, the iteration continues until the lower bound Λ(q) changes by less than a given threshold. In an alternative implementation, q(θ) may also be tested prior to computation of the lower bound Λ(q) in each iteration, such that if the value of q(θ) changes by less than another given threshold, then the iteration skips the computation and testing of the lower bound Λ(q) and exits the loop. In yet another implementation, individual factors of Equation (32) may be tested to determine whether to terminate the optimization of the modeling parameters.

In the described approach, approximate posterior distributions of the stochastic modeling parameters $\{\mu_m, \Lambda_m\}$, $\pi$, and $\{s_m, u_n\}$, as well as a value of the modeling parameter $\nu$, are determined. Given these modeling parameters, the Student mixture density of Equation (3) can be obtained to model the input data.

Figure 2:
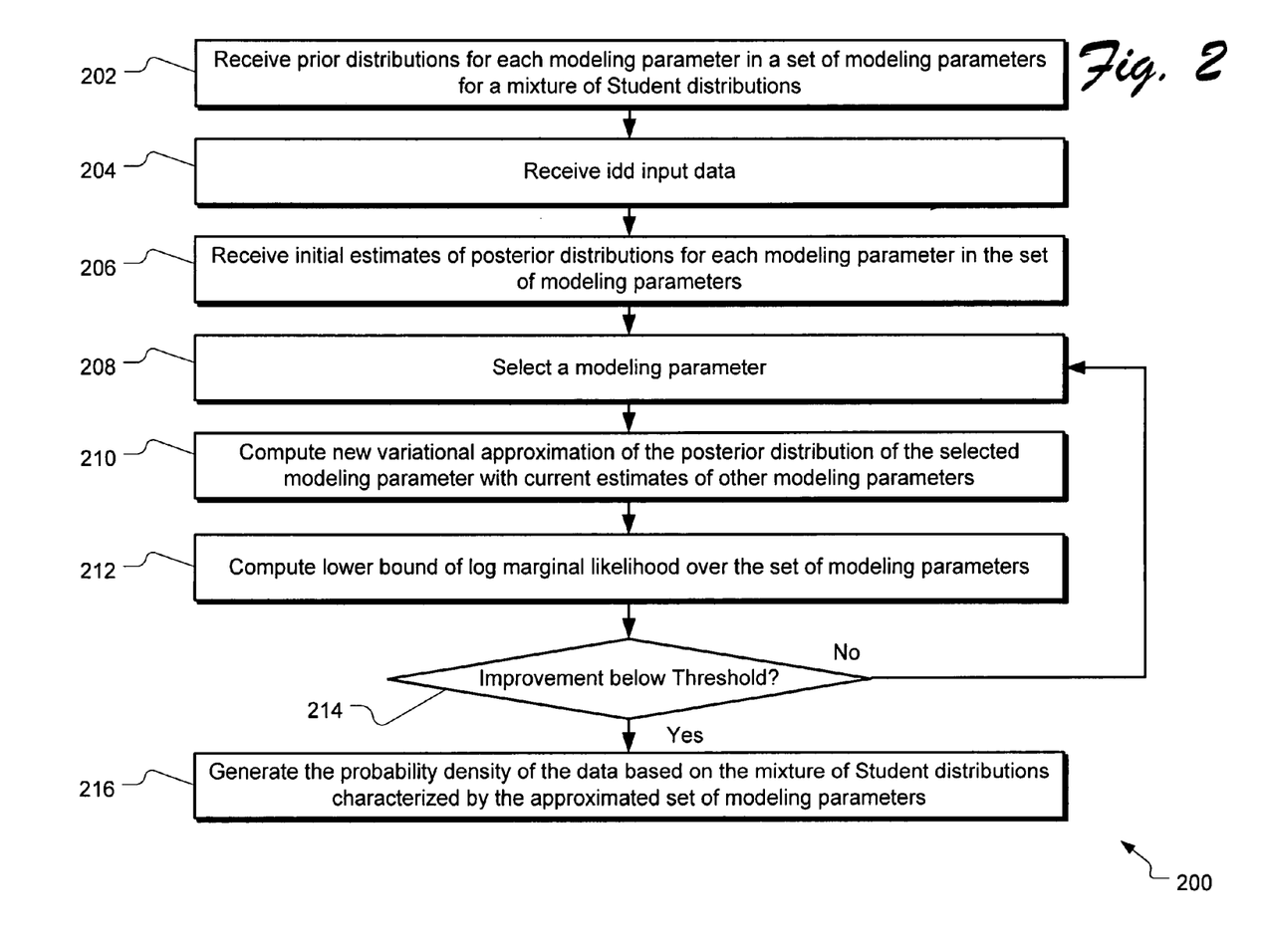
FIG. 2 illustrates exemplary operations for robust Bayesian mixture modeling.

FIG. 2 illustrates exemplary operations 200 for robust Bayesian mixture modeling. A receiving operation 202 receives prior distributions of each modeling parameter in the set of modeling parameters for a mixture of Student distributions. In one implementation, the prior distributions may be computed using the Equations (5), (6), (7), and (8), although other prior distributions may be used in alternative embodiments. As such, an operation of computing the prior distributions (not shown) may also be included in an alternative implementation.

Another receiving operation 204 receives the independent, identically distributed data. Exemplary data may include without limitation auditory speech data from an unknown number of speakers, where determining the correct number of speakers is part of the modeling process and image segmentation data from images containing few large and relatively homogeneous regions as well as several very small regions of different characteristics (outlier regions), where modeling of the few larger regions should not be notably affected by the presence of the outlier regions.

Yet another receiving operation 206 receives initial estimates of the posterior distributions for a set of modeling parameters for a mixture of Student distributions. The initial estimates may be received from another process or be determined in a determining operation (not shown) using a variety of methods, including a random approach. However, the optimization of the modeling parameter can resolve quicker if the initial estimates are closer to the actual posterior distributions. In one implementation, heuristics are applied to the prior distributions to determine these initial estimates. In a simple example, the posteriors are set equal to the priors. A more elaborate example is to heuristically combine the priors with the results of fast, non-probabilistic methods, such as K-means clustering.

A selection operation 208 selects one of the modeling parameters in the set of modeling parameters. A computation operation 210 computes a tractable approximation of the posterior distribution of the selected modeling parameter using the current estimates of the other modeling parameters. (In the first iteration, the current estimates of the other modeling parameters represent their initial estimates.) In one implementation, the current state of the estimate of each modeling parameter is stored in a storage location, such as in a memory.

In the illustrated implementation, a variational inference method produces the tractable approximation. In one variational inference approach, the tractable posterior distribution is approximated using the Equations (12), (18), (22), (25), and (28). The tractable approximation of the selected modeling parameter becomes the current estimate of that modeling parameter, which can be used in subsequent iterations. Alternatively, other approximation methods, including Monte Carlo techniques, may be employed.

A computation operation 212 computes the lower bound of the log marginal likelihood, such as by using Equation (11). If the lower bound is insufficiently optimized according to the computation operation 212, such as by improving by greater than a given threshold or by some other criterion, a decision operation 214 loops processing back to the selection operation 208, which selects another modeling parameter and repeats operation 210 212 and 214 in a subsequent iteration. However, if the lower bound is sufficiently optimized, processing proceeds to a generation operation 216, which generates the probability density of the data based on the mixture of Student distributions characterized by the current estimates of the modeling parameters (e.g., using Equation (4)).

It should be understood that the order of at least some of the operations in the described process may be altered without altering the results. Furthermore, other methods of determining whether the posterior distribution approximations of the modeling parameters are satisfactorily optimized, including testing whether the individual posterior distribution factors (e.g., q(s)) change little in each iteration or testing whether the product (e.g., q(θ)) of the posterior distribution factors changes little in each iteration.

Figure 3:
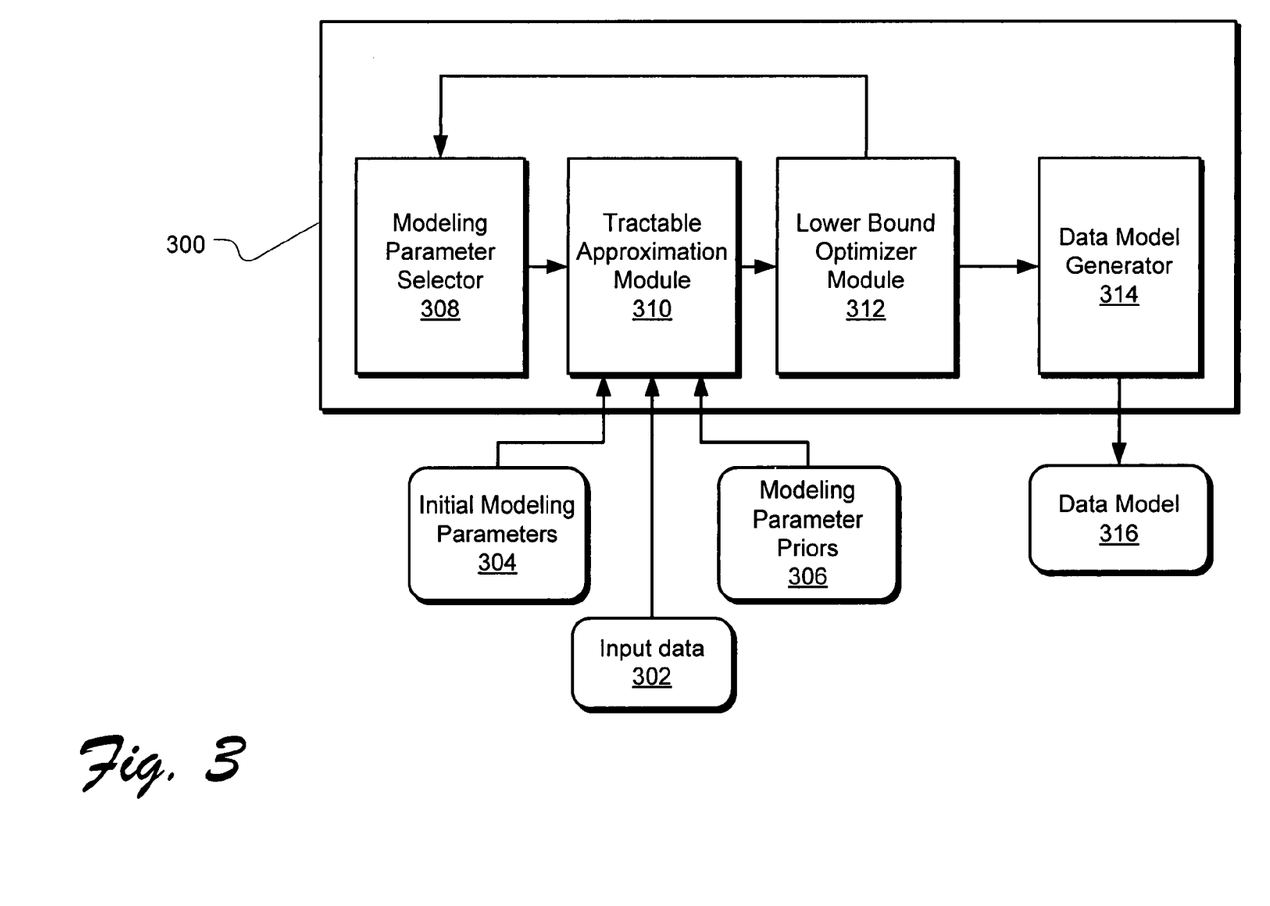
FIG. 3 illustrates an exemplary robust Bayesian mixture modeling system.

FIG. 3 illustrates an exemplary robust Bayesian mixture modeling system 300. Inputs to the system 300 include input data 302, initial estimates of the modeling parameters 304, and prior distributions of the modeling parameters 306.

A modeling parameter selector 308 selects a modeling parameter that is to be approximated in each iteration. A tractable approximation module 310 receives the inputs and the selection of the modeling parameter to generate a tractable approximation of the selected modeling parameter (e.g., based on variational inference or Monte Carlo techniques). In one implementation, the tractable approximation module 301 also maintains a current state of the estimate of each modeling parameter in a storage location, such as in a memory.

Based on the current estimates of the modeling parameters, including the new approximation of the selected modeling parameter, a lower bound optimizer module 312 computes the lower bound of the log marginal likelihood. If the lower bound fails to satisfy an optimization criterion (such as by increasing more than a threshold amount), the lower bound optimizer module 312 triggers the modeling parameter selector module 308 to select another modeling parameter in a next iteration. Otherwise, the current estimates of the modeling parameters are passed to a data model generator 314, which generates a data model 316 including the probability density of the data based on the mixture of Student distributions characterized by the current estimates of the modeling parameters (e.g., using Equation (4))

Figure 4:
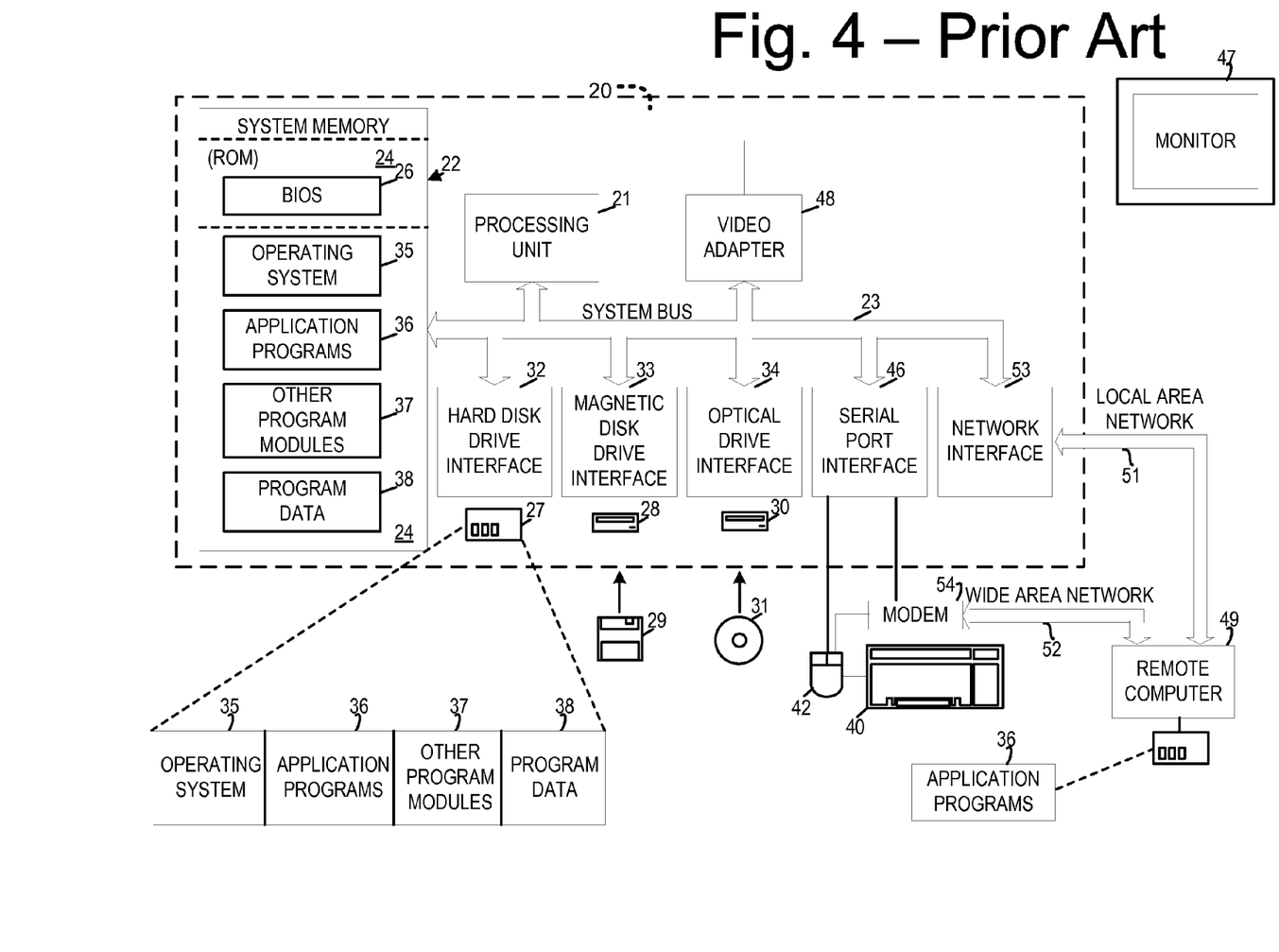
FIG. 4 illustrates a system useful for implementing an embodiment of the present invention.

The exemplary hardware and operating environment of FIG. 4 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 4. The logical connections depicted in FIG. 4 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a modeling parameter selector, a tractable approximation module, a lower bound optimizer module, a data model generator, and other modules may be incorporated as part of the operating system 35, application programs 36, or other program modules 37. Initial modeling parameter estimates, input data, modeling parameter priors, and other data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method comprising:

selecting a modeling parameter from a plurality of modeling parameters characterizing a mixture of Student distribution components;

computing an approximation of a posterior distribution for the selected modeling parameter based on an input set of data, the input set of data having been obtained from at least one microphone, and a current estimate of a posterior distribution of at least one unselected modeling parameter in the plurality of modeling parameters, computing the approximation being performed by a processor calculating $$q(s) = \prod_{n,m}^{N,M} p_{nm}^{S_{nm}}, q(\pi) = D(\pi \mid \alpha), q(\mu_m) = N(\mu_m \mid m_m, R_m),$$

$$q(\Lambda_m) = W(\Lambda_m \mid_m W_m, \eta_m), \text{ or } q(u_{nm}) = G(u_{nm} \mid a_{nm}, b_{nm});$$

computing a lower bound of a log marginal likelihood as a function of current estimates of the posterior distributions of the modeling parameters, the current estimates of the posterior distributions of the modeling parameters including the computed approximation of the posterior distribution of the selected modeling parameter;

determining if the lower bound has been satisfactorily optimized, wherein the lower bound is satisfactorily optimized when the computed lower bound has changed less than a threshold amount from a previously computed lower bound;

generating a probability density modeling the input set of data, the probability density including the mixture of Student distribution components, the mixture of Student distribution components being characterized by the current estimates of the posterior distributions of the modeling parameters, when the lower bound is satisfactorily optimized;

outputting the probability density, and outputting a number of speakers from the probability density.

2. The method of claim 1 wherein the computing operations comprise a first iteration and further comprising:

selecting a different modeling parameter from the plurality of modeling parameters and repeating in a subsequent iteration the operations of computing an approximation and computing a lower bound using the newly selected modeling parameter, when the lower bound is not satisfactorily optimized in the first iteration.

3. The method of claim 1 wherein computing a lower bound comprises:

computing the lower bound of the log marginal likelihood as a function of prior distributions of the modeling parameters.

4. The method of claim 1 wherein computing an approximation of a posterior distribution comprises:

computing a variational approximation of the posterior distribution of the selected modeling parameter.

5. The method of claim 1 wherein one of the plurality of modeling parameters represents a mean of each of the Student distribution components.

6. The method of claim 1 wherein one of the plurality of modeling parameters represents a precision matrix of the Student distribution components.

7. The method of claim 1 wherein one of the plurality of modeling parameters represents a scaling parameter of a precision matrix of the Student distribution components.

8. The method of claim 1 wherein one of the plurality of modeling parameters represents a mixing coefficients parameter of the Student distribution components.

9. The method of claim 1 wherein generating a probability density comprises:

generating the probability density including the mixture of Student distribution components, the mixture of Student distribution components being characterized by the current estimates of the posterior distributions of the modeling parameters and an estimate of the number of degrees of freedom of each Student distribution component.

10. The method of claim 1 further comprising:

storing the current estimates of the posterior distributions of the modeling parameters in a storage location.

11. The method of claim 1 wherein the input set of data represents auditory speech data from an unknown number of speakers.

12. A computer program product encoding a computer program for executing on a computer system a computer process for minimizing effects of outlier data on data modeling, the computer process comprising:

selecting a modeling parameter from a plurality of modeling parameters characterizing a mixture of Student distribution components;

computing an approximation of a posterior distribution for the selected modeling parameter based on an input set of data, the input set of data having been obtained from at least one microphone, and a current estimate of a posterior distribution of at least one unselected modeling parameter in the plurality of modeling parameters, the current estimate being computed using $$p(s \mid \pi) = \prod_{n,m}^{N,M} \pi_{nm}^{S_{nm}}, \ p(\mu_m) = N(\mu_m \mid m, \rho I),$$

$$p(\Lambda_m) = W(\Lambda_m W_0, \eta_0), \text{ or } p(\pi) = D(\pi \mid \alpha);$$

computing a lower bound of a log marginal likelihood as a function of current estimates of the posterior distributions of the modeling parameters, the current estimates of the posterior distributions of the modeling parameters including the computed approximation of the posterior distribution of the selected modeling parameter;

determining if the lower bound has been satisfactorily optimized, wherein the lower bound is satisfactorily optimized when the computed lower bound has changed less than a threshold amount from a previously computed lower bound;

generating a probability density modeling the input set of data, the probability density including the mixture of Student distribution components, the mixture of Student distribution components being characterized by the current estimates of the posterior distributions of the modeling parameters, when the lower bound is satisfactorily optimized;

outputting the probability density; and outputting a number of speakers from the probability density.

13. The computer program product of claim 12 wherein the computing operations comprise a first iteration and further comprising:

selecting a different modeling parameter from the plurality of modeling parameters and repeating in a subsequent iteration the operations of computing an approximation and computing a lower bound using the newly selected modeling parameter, when the lower bound is not satisfactorily optimized in the first iteration.

14. The computer program product of claim 12 wherein computing a lower bound comprises:

computing the lower bound of the log marginal likelihood as a function of prior distributions of the modeling parameters.

15. The computer program product of claim 12 wherein computing a approximation of a posterior distribution comprises:

computing a variational approximation of the posterior distribution of the selected modeling parameter.

16. The computer program product of claim 12 wherein one of the plurality of modeling parameters represents a mean of each of the Student distribution components.

17. The computer program product of claim 12 wherein one of the plurality of modeling parameters represents a precision matrix of the Student distribution components.

18. The computer program product of claim 12 wherein one of the plurality of modeling parameters represents a scaling parameter of a precision matrix of the Student distribution components.

19. The computer program product of claim 12 wherein one of the plurality of modeling parameters represents a mixing coefficients parameter of the Student distribution components.

20. The computer program product of claim 12 wherein generating a probability density comprises:

generating the probability density including the mixture of Student distribution components, the mixture of Student distribution components being characterized by the current estimates of the posterior distributions of the modeling parameters and an estimate of the degrees of freedom of each Student distribution component.

21. The computer program product of claim 12 wherein the computer process further comprises:
storing the current estimates of the posterior distributions of the modeling parameters in a storage location.

22. The computer program product of claim 12 wherein the input set of data represents auditory speech data from an unknown number of speakers.

23. The computer program product of claim 12 wherein the input set of data represents image segmentation data from images.

24. A system comprising:
a processor;
a memory;
at least one microphone;
a modeling parameter selector operable with the processor and memory to select a modeling parameter from a plurality of modeling parameters characterizing a mixture of Student distribution components;
an approximation module computing an approximation of a posterior distribution for the selected modeling parameter based on an input set of data, the input set of data having been obtained from the at least one microphone, and a current estimate of a posterior distribution of at least one unselected modeling parameter in the plurality of modeling parameters;
a lower bound optimizer module computing a lower bound of a log marginal likelihood as a function of current estimates of the posterior distributions of the modeling parameters using $$L(q \| q) \equiv \int q(\theta) \ln\left\{\frac{p(X, \theta)}{q(\theta)}\right\} d\theta \le \ln p(X),$$

the current estimates of the posterior distributions of the modeling parameters including the computed approximation of the posterior distribution of the selected modeling parameter, and determining if the lower bound has been satisfactorily optimized, wherein the lower bound is satisfactorily optimized when the computed lower bound has changed less than a threshold amount from a previously computed lower bound;
a data model generator generating a probability density modeling the input set of data, the probability density including the mixture of Student distribution components, the mixture of Student distribution components being characterized by the current estimates of the posterior distributions of the modeling parameters, when the lower bound is satisfactorily optimized;
an output device outputting the probability density and outputting a number of speakers from the probability density.

25. The system of claim 24 wherein the lower bound optimizer computes the lower bound of the log marginal likelihood as a function of prior distributions of the modeling parameters.

26. The system of claim 24 wherein the approximation module computes a variational approximation of the posterior distribution of the selected modeling parameter.

27. The system of claim 24 wherein one of the plurality of modeling parameters represents a mean of each of the Student distribution components.

28. The system of claim 24 wherein one of the plurality of modeling parameters represents a precision matrix of the Student distribution components.

29. The system of claim 24 wherein one of the plurality of modeling parameters represents a scaling parameter of a precision matrix of the Student distribution components.

30. The system of claim 24 wherein one of the plurality of modeling parameters represents a mixing coefficients parameter of the Student distribution components.

31. The system of claim 24 wherein the data model generator generates the probability density including the mixture of Student distribution components, the mixture of Student distribution components being characterized by the current estimates of the posterior distributions of the modeling parameters and an estimate of the degrees of freedom of each Student distribution component.

32. The system of claim 24 further comprising:
a memory storing the current estimates of the posterior distributions of the modeling parameters.

33. The system of claim 24 wherein the input set of data represents auditory speech data from an unknown number of speakers.

34. The system of claim 24 wherein the input set of data represents image segmentation data from images.

35. A method comprising:
computing an approximation of a posterior distribution for a selected modeling parameter of a plurality of modeling parameters characterizing a mixture of Student distribution components based on an input set of data, the input set of data having been obtained from a microphone, and a current estimate of a posterior distribution of at least one unselected modeling parameter in the plurality of modeling parameters, wherein computing the approximation is performed by a processor calculating $$q(s) = \prod_{n,m}^{N,M} p_{nm}^{S_{nm}}, \; q(\pi) = D(\pi \mid \alpha), \; q(\mu_m) = N(\mu_m \mid m_m, R_m),$$

$$q(\Lambda_m) = W(\Lambda_m \mid_m W_m, \eta_m), \text{ or } q(u_{nm}) = G(u_{nm} \mid a_{nm}, b_{nm});$$

determining whether current estimates of the posterior distributions of the modeling parameters are satisfactorily optimized in relation to a predetermined criterion, the current estimates of the posterior distributions of the modeling parameters including the computed approximation of the posterior distribution of the selected modeling parameter;
modeling the input set of data by the mixture of Student distribution components, the mixture of Student distribution components being characterized by the current estimates of the posterior distributions of the modeling parameters;
outputting the modeling of the input set of data; and
outputting a number of speakers from the probability density.

36. The method of claim 35 wherein the computing operation and determining operation comprise a first iteration and further comprising:
selecting a different modeling parameter from the plurality of modeling parameters and repeating in a subsequent iteration the operations of computing a approximation and computing a lower bound using the newly selected modeling parameter, when the lower bound is not satisfactorily optimized in the first iteration.

37. The method of claim 35 wherein the operation of determining whether current estimates of the posterior distributions of the modeling parameters are satisfactorily optimized comprises:
   computing a lower bound of the log marginal likelihood as a function of prior distributions of the modeling parameters and a variational posterior distribution; and
   determining whether the lower bound satisfies the predetermined criterion of the selected modeling parameter.

38. The method of claim 35 wherein computing a approximation of a posterior distribution comprises:
   computing a variational approximation of the posterior distribution.

39. The method of claim 35 wherein one of the plurality of modeling parameters represents a mean of each of the Student distribution components.

40. The method of claim 35 wherein one of the plurality of modeling parameters represents a precision matrix of the Student distribution components.

41. The method of claim 35 wherein one of the plurality of modeling parameters represents a scaling parameter of a precision matrix of the Student distribution components.

42. The method of claim 35 wherein one of the plurality of modeling parameters represents a mixing coefficients parameter of the Student distribution components.

43. The method of claim 35 wherein modeling the input data comprises:
   generating the probability density including the mixture of Student distribution components, the mixture of Student distribution components being characterized by the current estimates of the posterior distributions of the modeling parameters and an estimate of the degrees of freedom of each Student distribution component.

44. The method of claim 35 further comprising:
   storing the current estimates of the posterior distributions of the modeling parameters in a storage location.

45. A computer program product encoding a computer program for executing on a computer system a computer process for minimizing effects of outlier data on data modeling, the computer process comprising:
   computing an approximation of a posterior distribution for a selected modeling parameter of a plurality of modeling parameters characterizing a mixture of Student distribution components based on an input set of data, the input set of data having been obtained from a microphone, and a current estimate of a posterior distribution of at least one unselected modeling parameter in the plurality of modeling parameters, computing the approximation being performed by a processor calculating $$q(s) = \prod_{n,m}^{N,M} p_{nm}^{S_{nm}}, \ q(\pi) = D(\pi \mid \alpha), \ q(\mu_m) = N(\mu_m \mid m_m, R_m),$$

$$q(\Lambda_m) = W(\Lambda_m \mid_m W_m, \eta_m), \text{ or } q(u_{nm}) = G(u_{nm} \mid a_{nm}, b_{nm});$$

determining whether current estimates of the posterior distributions of the modeling parameters are satisfactorily optimized in relation to a predetermined criterion, the current estimates of the posterior distributions of the modeling parameters including the computed approximation of the posterior distribution of the selected modeling parameter;
   modeling the input set of data by the mixture of Student distribution components, the mixture of Student distribution components being characterized by the current estimates of the posterior distributions of the modeling parameters;
   outputting the modeling of the input set of data; and
   outputting a number of speakers from the probability density.

46. The computer program product of claim 45 wherein the computing operation and determining operation comprise a first iteration and further comprising:
   selecting a different modeling parameter from the plurality of modeling parameters and repeating in a subsequent iteration the operations of computing a approximation and computing a lower bound using the newly selected modeling parameter, when the lower bound is not satisfactorily optimized in the first iteration.

47. The computer program product of claim 45 wherein the operation of determining whether current estimates of the posterior distributions of the modeling parameters are satisfactorily optimized comprises:
   computing a lower bound of the log marginal likelihood as a function of prior distributions of the modeling parameters and a variational posterior distribution; and
   determining whether the lower bound satisfies the predetermined criterion.

48. The computer program product of claim 45 wherein computing an approximation of a posterior distribution comprises:
   computing a variational approximation of the posterior distribution of the selected modeling parameter.

49. The computer program product of claim 45 wherein one of the plurality of modeling parameters represents a mean of each of the Student distribution components.

50. The computer program product of claim 45 wherein one of the plurality of modeling parameters represents a precision matrix of the Student distribution components.

51. The computer program product of claim 45 wherein one of the plurality of modeling parameters represents a scaling parameter of a precision matrix of the Student distribution components.

52. The computer program product of claim 45 wherein one of the plurality of modeling parameters represents a mixing coefficients parameter of the Student distribution components.

53. The computer program product of claim 45 wherein modeling the input data comprises:
   generating the probability density including the mixture of Student distribution components, the mixture of Student distribution components being characterized by the current estimates of the posterior distributions of the modeling parameters and an estimate of the degrees of freedom of each Student distribution component.

54. The computer program product of claim 45 wherein the computer process further comprises:
   storing the current estimates of the posterior distributions of the modeling parameters in a storage location.

55. A system comprising:
   a processor;
   a memory;
   at least one microphone;
   a approximation module operable with the processor and memory to compute an approximation of a posterior distribution for a selected modeling parameter of a plurality of modeling parameters characterizing a mixture of Student distribution components based on an input set of data, the input set of data having been obtained form the at least one microphone, and a current estimate of a posterior distribution of at least one unselected modeling parameter in the plurality of modeling parameters by calculating $$q(s) = \prod_{n,m}^{N,M} p_{nm}^{S_{nm}}, \; q(\pi) = D(\pi \mid \alpha), \; q(\mu_m) = N(\mu_m \mid m_m, R_m),$$

$$q(\Lambda_m) = W(\Lambda_m \mid_m W_m, \eta_m), \text{ or } q(u_{nm}) = G(u_{nm} \mid a_{nm}, b_{nm});$$

an optimizer module determining whether current estimates of the posterior distributions of the modeling parameters are satisfactorily optimized in relation to a predetermined criterion, the current estimates of the posterior distributions of the modeling parameters including the computed approximation of the posterior distribution of the selected modeling parameter;

a data model generator modeling the input set of data by the mixture of Student distribution components, the mixture of Student distribution components being characterized by the current estimates of the posterior distributions of the modeling parameters;

an output device outputting the modeling of the input set of data and outputting a number of speakers from the probability density.

56. The system of claim 55 wherein optimizer module computes a lower bound of the log marginal likelihood as a function of prior distributions of the modeling parameters and a variational posterior distribution, and determines whether the lower bound satisfies the predetermined criterion.

57. The system of claim 55 wherein the approximation modules computes a variational approximation of the posterior distribution of the selected modeling parameter.

58. The system of claim 55 wherein one of the plurality of modeling parameters represents a mean of each of the Student distribution components.

59. The system of claim 55 wherein one of the plurality of modeling parameters represents a precision matrix of the Student distribution components.

60. The system of claim 55 wherein one of the plurality of modeling parameters represents a scaling parameter of a precision matrix of the Student distribution components.

61. The system of claim 55 wherein one of the plurality of modeling parameters represents a mixing coefficients parameter of the Student distribution components.

62. The system of claim 55 wherein modeling the input data comprises:
    generating the probability density including the mixture of Student distribution components, the mixture of Student distribution components being characterized by the current estimates of the posterior distributions of the modeling parameters and an estimate of the degrees of freedom of each Student distribution component.

63. The system of claim 55 further comprising:
    a memory storing the current estimates of the posterior distributions of the modeling parameters.

64. The method of claim 1 further comprising populating the input set of data with only observed data.

* * * * *